US012168356B2

(12) United States Patent
Evans et al.

(10) Patent No.: US 12,168,356 B2
(45) Date of Patent: Dec. 17, 2024

(54) METHOD AND SYSTEM FOR UNDERBASE WITH HIGHLIGHT WHITE

(71) Applicant: Fiery, LLC, Fremont, CA (US)

(72) Inventors: David John Evans, London (GB); David James Reny, Ottawa (CA)

(73) Assignee: FIERY, LLC, Fremont, CA (US)

( * ) Notice: Subject to any disclaimer, the term of this patent is extended or adjusted under 35 U.S.C. 154(b) by 101 days.

(21) Appl. No.: 17/934,466

(22) Filed: Sep. 22, 2022

(65) Prior Publication Data

US 2024/0100855 A1 Mar. 28, 2024

(51) Int. Cl.
*B41J 2/21* (2006.01)
*B41J 11/00* (2006.01)

(52) U.S. Cl.
CPC ........ *B41J 2/2117* (2013.01); *B41J 11/00214* (2021.01)

(58) Field of Classification Search
CPC ........................... B41J 2/2117; B41J 11/00214
USPC ............................................................ 347/12
See application file for complete search history.

(56) References Cited

U.S. PATENT DOCUMENTS 6,808,244 B2 10/2004 Rosenberger et al.
8,784,508 B2 7/2014 Ellis
2002/0159080 A1* 10/2002 Feng ...................... H04N 1/403 358/1.9
2006/0017761 A1 1/2006 Matsuzawa et al.
2006/0207448 A1 9/2006 Fresener et al.
2007/0067928 A1* 3/2007 Ellis .................... D06P 1/67333 8/445
2007/0297668 A1* 12/2007 Matsuzaki ............... H04N 1/58 382/163
2009/0244568 A1* 10/2009 Watanabe ............ H04N 1/6027 358/1.9
2010/0177327 A1 7/2010 Maheshwari
2013/0215440 A1 8/2013 Chandermohan
2014/0126001 A1 5/2014 Nudurumati et al.
2021/0110222 A1 4/2021 Maheshwari
2022/0084211 A1 3/2022 Metcalfe et al.
2022/0256053 A1 8/2022 Bartels

FOREIGN PATENT DOCUMENTS

WO 2020110130 A1 6/2020

OTHER PUBLICATIONS

"Layer Types & White Ink Printing" retrieved online on Jun. 25, 2022 from url: www.melco-service.com/docs/melcojet/MelcoRIP_RevA_Web/Layer_Types_and_White_Ink_Printing.htm; 4 pages; copyright Sep. 2010.

* cited by examiner

*Primary Examiner* — Jason S Uhlenhake
*Assistant Examiner* — Alexander D Shenderov
(74) *Attorney, Agent, or Firm* — Perkins Coie LLP

(57) ABSTRACT

Techniques are provided for printing white underbase image data and highlight white image data in one pass using digital printing technologies. The techniques include increasing the white ink in the white only (or near white only) areas of the image data by combining the white underbase image data and the white ink (or near white ink) image data.

20 Claims, 8 Drawing Sheets

100

200

300

400

550

METHOD AND SYSTEM FOR UNDERBASE WITH HIGHLIGHT WHITE

BACKGROUND OF THE INVENTION

Technical Field

This invention relates generally to the field of digital image printing. More specifically, this invention relates to a method and system for printing underbase white with highlight white in one pass using digital inkjet printers.

Description of the Related Art

When printing onto color substrates, such as printing onto a black t-shirt, typically a white layer is printed first. This white layer is called an underbase and covers the black area where it is desired to print color. The highlight white, which is another name for the white color ink, is printed in white and sometimes in very close to white only areas. It is desirable that the pure white areas are as bright a white as possible. Challenges to printing white and color image data onto dark substrates present themselves. For example, a large amount of white ink can be needed to block out a black background completely to obtain a bright vibrant white. Too much white ink can bleed with the other colors, leaving a less than desirable printed outcome.

Thus, ink limits can be set before the printing process to help control undesirable effects from the inks bleeding into each other.

SUMMARY

Techniques are provided for printing white underbase image data and highlight white image data in one pass using digital printing technologies. The techniques include increasing the white ink in the white only (or near white only) areas of the image data by combining the white underbase image data and the white ink (or near white ink) image data.

DETAILED DESCRIPTION

Techniques are provided for printing white underbase image data and highlight white image data innovatively in one pass using digital printing technologies. The techniques innovatively include increasing the white ink in the white only (or near white only) areas of the image data by combining the white underbase image data and the white ink (or near white ink) image data.

According to current techniques, the underbase white ink is printed and any highlight white ink is printed as a separate or second pass, with or without the color. It has been found that an extra pass increases the print time and with the direct to film (DTF) process, which is a single pass process, a highlight white therefor cannot be printed. It should be appreciated that color, according to embodiments herein, can include or be referred to as highlights, midtones, and shadows.

Figure 1:
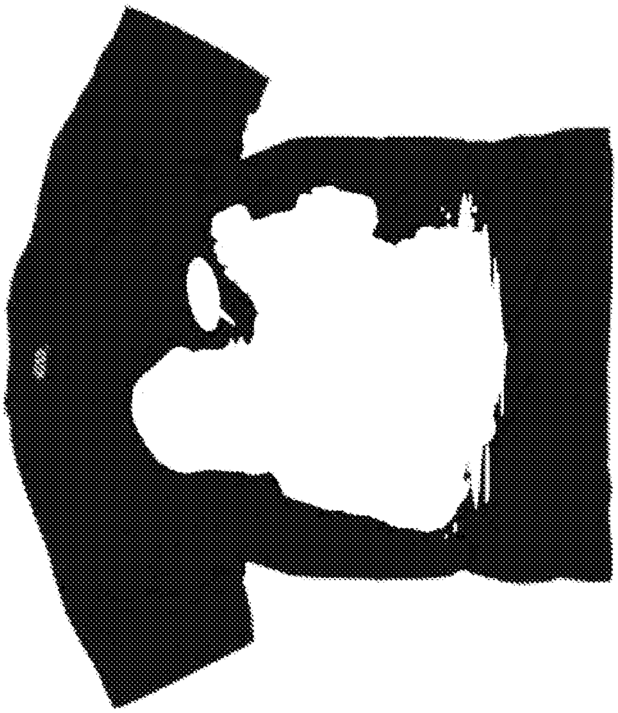
FIG. 1 is a schematic diagram of a white underbase of an image printed onto a black shirt, in accordance with an embodiment.
Figure 2:
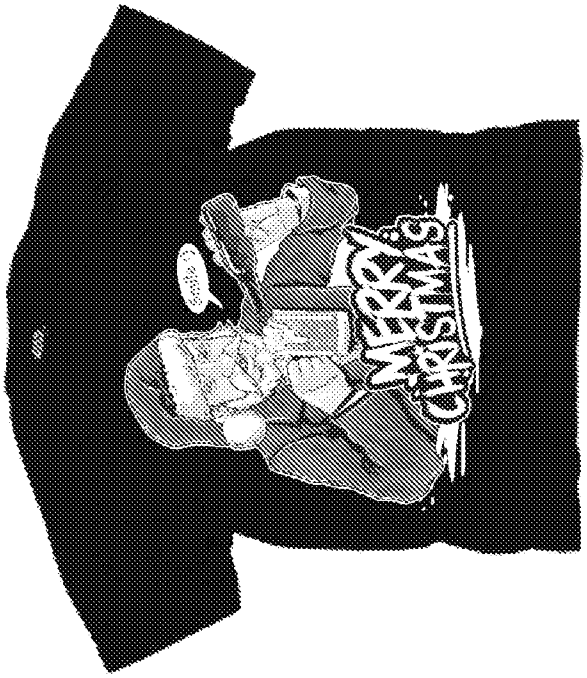
FIG. 2 is a schematic diagram of the color image data printed onto the underbase of the image and black shirt of FIG. 1, in accordance with an embodiment.

When printing onto color substrates, such as printing onto a black t-shirt, typically a white layer is printed first. This is to obtain vibrant or otherwise expected colors on the garment, rather than colors that are dulled by the dark background. This white layer is called an underbase and covers the black area where it is desired to print color. An example of underbase white ink printed onto a black shirt in accordance with embodiments herein can be seen in FIG. 1. Then, in accordance with embodiments herein, the color image ink layers are printed thereon, as can be seen in FIG. 2.

Figure 3:
FIG. 3 is a schematic diagram of the highlight white image data printed onto the black shirt, in accordance with an embodiment.

FIG. 3 shows an example of only the highlight white ink being printed onto a black substrate, such as the black t-shirt, in accordance with embodiments herein. The highlight white ink, which is another name for the white color ink, is printed in white only areas and sometimes in very close to white only areas. It is often desirable that the pure white areas are as bright a white as possible.

For purposes of discussion herein, close to white is meant as areas that are not perceivably different from white to the human eye. For example, if a printer prints 2% of yellow, it is possible that the human eye would not be able to see the yellow color. Especially, if such yellow color were next to a white color, the human eye most likely would not be able to see or discern the yellow. Thus, in an embodiment, the printer can be configured to treat a color that is close to white (e.g., 1-2% of a certain color, such as for example yellow) as a highlight white. In another embodiment, the printer can be configured to only print the areas that are pure white and not close to white as a highlight white.

Conceptually, the human perception of colors can boil down to how black is the black and how white is the white. For example, in television technology, typical buyers make decisions on which television to buy based on how black the black point of the screen is and how white is the white point of the screen. Therefore, boosting the white point of the television screen and then logically to any screen can make a significant difference to human eye perception.

Unfortunately, it can be challenging to print white and color image data onto dark substrates. To achieve bright colors on a dark substrate can require a large volume of ink deposited thereon. However, depositing too much ink of any color, let alone many of the colors or the white inks, often leads to bleeding of the colors or of the ink rolling off of the substrate before solidifying. As another example, a large amount of white ink can be needed to block out a black background completely for obtaining a bright vibrant white. Too much white ink can bleed with the other colors, leaving a less than desirable printed outcome. To mitigate against too much of any ink being deposited, ink limits can be set before the printing process to help control undesirable effects from the inks bleeding into each other.

In accordance with embodiments herein, three technologies use the white color in digital printing. They are inkjet printing, laser printing, and thermal printing. All these technologies have the same challenge when printing white. A lot of white is required to block out a black or otherwise dark background completely to get a bright vibrant white.

Inkjet printing is a wet on wet process. Inkjet white is widely used for t-shirt print as well as for printing onto other substrates.

Laser printing technology is toner based and typically the mixing problem does not exist. However, tonal limits exist for different issues. For example, toner based devices can have a toner limit typically around 230% for CMYK and 280% using CMYK+White. Such limits can be related to the fuser.

Presently, the tonal printer can be configured to deposit 100% white. However, in one embodiment, a printer is configured to have two (or more) white toners. In this embodiment, one (or more) of the white toners is for the underbase and a second (or more) of the white toners is for the highlight white, in the single pass process.

In another embodiment, a thermal printer is configured with a second (or more) white thread. In this embodiment, the one (or more) of the white threads is for the underbase and a second (or more) of the white threads is for the highlight white, in the single pass process.

It should be appreciated that the innovation is about generating the underbase and at the same time generating the highlight by making the underbase a greater value, regardless of the type of output, inkjet, laser, thermal, and so on.

Some of the areas white ink used in inkjet are, but are not limited to, Direct To Garment (DTG), Direct To Film (DTF), and ultraviolet (UV). Consistent with embodiments herein, examples of substrates are garments such as but not limited to t-shirts: black cotton t-shirts, polyester t-shirts, tote bags, caps, fabrics, plastics, and acrylic. Typical garments are predominantly cotton based or materials onto which inks can be printed. Examples of UV printable substrates include but are not limited to books, glass, and metal wood.

Consistent with embodiments herein, when working with film, the color is put down first, then the white, and then white is covered with a powder. The powder serves to make a type of glue when heated. Afterwards, the film can be pressed onto the desired object. For example, it can be considered easier to transfer a film onto a cap than print on a cap. Mounting a cap for purposes of printing thereon can be cumbersome. It has been found to be easier to use a heat press to press the film at the area or location where the print is desired. Examples of such film includes but are not limited to plastic or polyester. A specific example of such film is a polyester or polyethylene terephthalate (PET) film, which is a clear thermoplastic made from ethylene glycol and dimethyl terephthalate (DMT).

In present day DTF technology, the process or configured system prints onto a film and then presses such film onto a substrate such as a shirt. DTF has been found to be much faster and much less expensive than printing directly onto garment. The machines are cheaper to produce and the inks and film also are cheaper. However, DTF technology is a one pass only process. There is no way of going back to deposit or otherwise achieve a highlight white. According to present day DTF processes, the underbase is printed and the color is deposited on such underbase. Further, DTF is a wet on wet process. Thus, there is a limit to how much white can be put down because the colors likely will merge. Therefore, a problem exists of how to get that white to be brighter.

However, the innovation leverages the notion that in the areas of white, in many instances not as much white as could be deposited, without negative effects and in areas where cyan, magenta, yellow, and black (CMYK) would not be deposited, was being put down. Thus, instead of using a blanket white limit, one size fits all type of limit, because such limit was needed for the color areas, the innovation is configured to put down a bit more in areas that are pure white or close to pure white. Consistent with embodiments herein, most printers print CMYK, while others might print other spot colors such as but not limited to orange or green. Thus, a series of process colors are used to make up the color data.

The innovation also can be used in screen printing. Currently, in screen printing, many passes are applied. A carousel for printing is employed where the colors are printed separately. Highlight white, which is identified as the solid white areas, is achieved by putting down another coat of white over the underbase to give such areas a bit of a boost. Such screen print processes use a flash cure between the underbase and the CMYK colors.

Due to the amount of white ink required to block out a background color such as black inkjet, it has been found that often multiple white print heads are included in the printing process. For example, one configuration of print heads consistent with embodiments herein can include:

for CMYK inks=4 print heads (1 print head for each channel); and for White ink=4 print heads (yielding 4×White for white density).

As mentioned above, currently, to print an underbase and a highlight requires a separate pass for the highlight, which slows down production. That is, typically, once the white layer is printed, then the media is rewound and the color is printed down as a separate pass. Additionally, in accordance with some technologies and/or devices it is not possible to perform multiple passes and therefore not possible to generate a highlight white in the product. For example, in roll to roll machines, only one pass is possible. For example, DTF processing configurations only allow one pass for printing. In some configurations, when two passes are not possible, the print heads are offset. For example, the print heads for the white are offset from the print heads for the color. The white ink literally is deposited first and color is deposited behind it.

Consistent with embodiments herein, with inkjet technology there are maximum ink limits. Such ink limits can be based on the ink type, substrate, and inkjet technology. Ink limits typically are measured as a percentage, for example as follows:

CMYK=400% (100% for each channel);

CMYK+4×VVhite=400%; and

Total=800%.

In an embodiment, the inkjet printer might not be configured to the 800 maximum value because it is a wet on wet process and the ink might just run off the substrate. Further, inkjet printers typically do not employ flash cures because hot temperatures and print heads do not mix well together. By doing so, the inks in the print heads tend to cure and then the print heads stop printing all together.

DTG and DTF are each a wet on wet process. In DTG, the CMYK is printed onto the white before its dry. In DTF, the white is printed onto the CMYK before its dry. Thus, too much white ink may cause the CMYK to mix with the white ink and the end result is that the colors can look washed out.

In UV printing the inks are cured as they are printed, but the UV lamps can only cure a certain percentage of ink and are not always capable of curing the overall maximum ink that can be printed. UV can also have other issues with high ink volumes such as banding.

Consistent with embodiments herein, for the color to get good results, such as good reds and greens, the printing process needs a certain amount of ink. Therefore, when setting the ink limits, the ink limits for CMYK cannot be set too low. Also, also, if too little white is configured then it will not matter how much CMYK is printed (within possibilities), because the resulting print will nonetheless look dull on dark substrates.

Thus, in accordance with embodiments herein, to obtain a good print, it is desirable to ink limit the CMYK and the white ink. An example of ink limiting is 800% maximum ink limit and an example of 800% maximum ink limit might be as shown below. It should be appreciated that the total number of ink amount (e.g., 580% as shown below) does not have to equal the maximum ink limit (e.g., 800% as described above).

280% for CMYK; and

300% for White.

Figure 4:
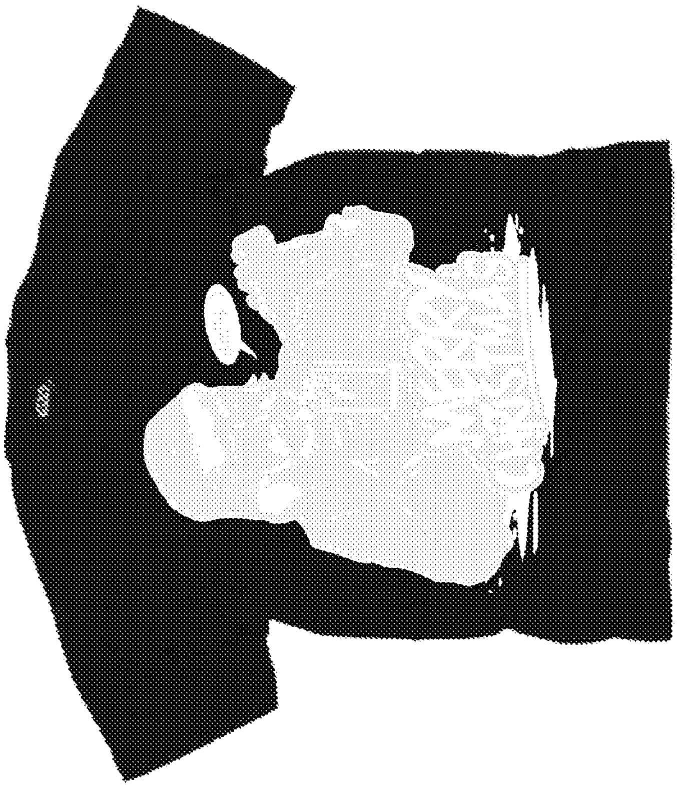
FIG. 4 is a schematic diagram underbase image data and the highlight white image data combined and printed onto the black shirt, in accordance with an embodiment.

Consistent with embodiments herein, one solution provided by the innovation is instead of having just one white ink limit, the system and method provide two white ink limits in a single pass. Underbase ink limit can be the white ink limit when CMYK is being printed. Highlight white limit can be the white ink limit used when printing only white and no (or very little) CMYK. An example of printing both the underbase and the highlight combined in accordance with embodiments herein is shown in FIG. 4.

Thus, embodiments herein are configured to allow for the underbase and the highlight white ink limits to be input. An embodiment can be understood with reference to FIG. 5A, an example input graphical user interface 500. The underbase and highlight option 502 is selected. Thus, GUI 500 is configured to allow a white ink strength in the form of a maximum ink percentage 504 to be input by a user (e.g., white for CMYK is set as 75 for 75%). GUI 500 further is configured to allow a highlight white strength percentage 506 to be input by a user (e.g., highlight (white areas) can use 100 for 100%, the maximum white available). It should be appreciated that regardless of 4×White or 2×1×White, the system and method display as 0-100%. It further should be appreciated that the user can be an individual person making the selection or can be a processor such as for example a processor either computing the percentage amounts to enter or being programmed to enter the percentage amounts. Also, the amounts entered are shown as percentages, but other quantifiable values, such as for example raw values, can be entered and understood by the system and method.

In an embodiment using 4×White, such value can be entered as 0 to 400%. Other ways of limiting can depend on the technology. For instance, in the case of a 2-bit device (with small, medium, and large dots as found on inkjet printers), the limits can be set by selecting ranges for the use of when and how much of each dot size to use. Such technique can have advantages as mixing different dots sizes at 100% can reduce banding. An embodiment can be understood with reference to FIG. 5B, an example of an interface 550 that can be used to input the different dot size usage that may also affect the total ink limit. In this example screenshot, the maximum value of 85, the minimum values of 0, and the transition value of 20 is selected or input for small dots. The maximum value of 170, the minimum values of 0, and the transition value of 20 is selected or input for medium dots. The overall percentage coverage value is selected or input as 100.

Figure 6:
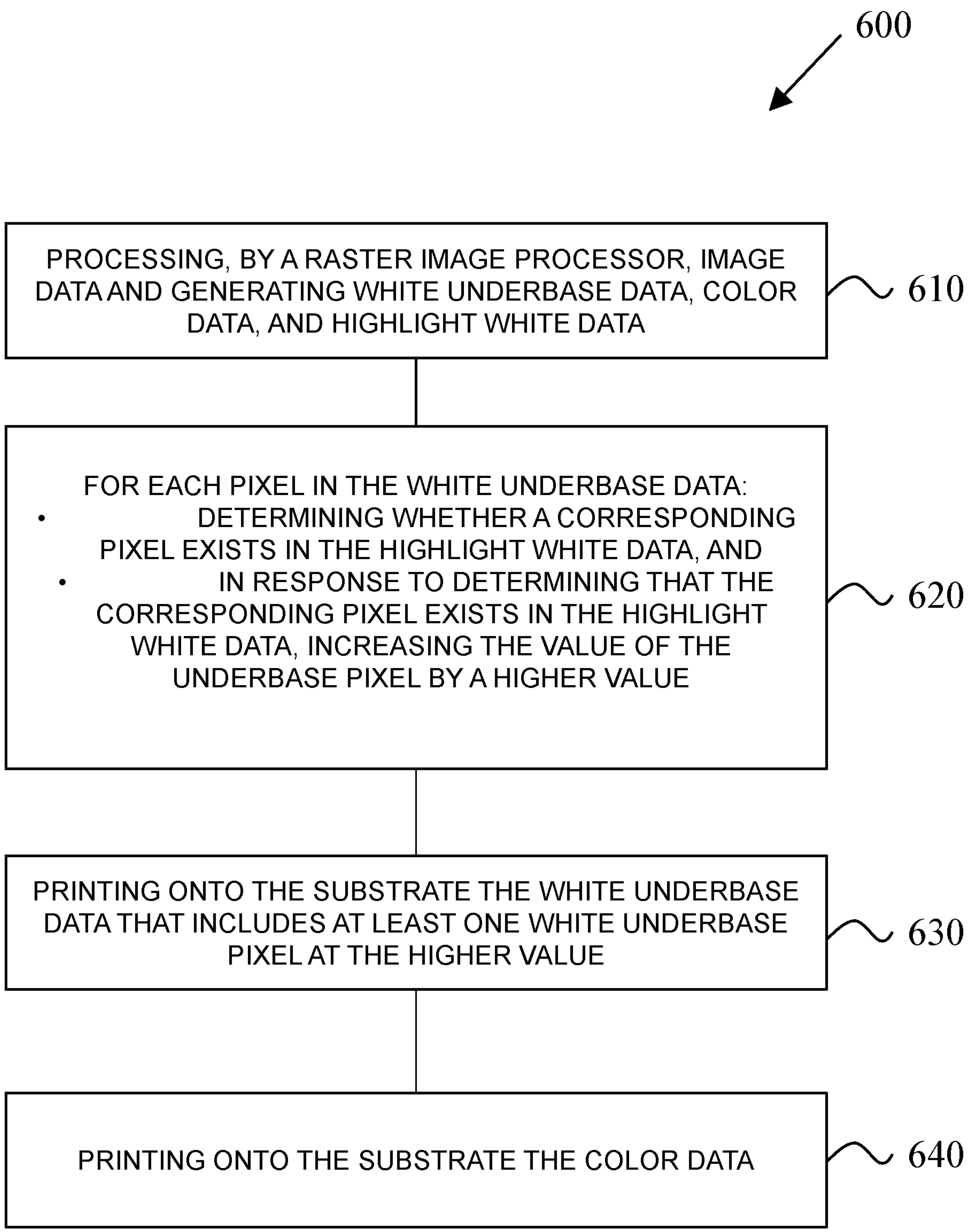
FIG. 6 is a flow diagram of a method to print underbase white with highlight white in one pass using digital inkjet printers, in accordance with an embodiment.

An embodiment can be understood with reference to FIG. 6, a flow diagram 600 of a method to print underbase white with highlight white in one pass using digital inkjet printers.

At step 610, the raster image processor (e.g., processor 702 processing instructions 726 of FIG. 7) processes image data. Included in such image data can be the maximum ink percentage 504 and/or the highlight white strength percentage 506 both of FIG. 5A. The processing includes generating from the image data (a) the underbase data, (b) the color data (e.g., CMYK data), and (c) the highlight white data. Thus, the RIP process creates a new plane of data, which is a highlight white, in addition to the underbase plane and the CMYK planes. Consistent with embodiments herein, the color output device is not limited to CMYK, but can be CMY, CMYKOG (Orange and Green) or one of many other types of combinations as there is a wide range of ink combinations used these days for process color. That is, where the color data can be derived from any combination of a process color space and where the process color space includes any of or any combination of CMYK, CMY, and CMYKOG, but is not limited to such color spaces.

In an embodiment, the new plane of highlight white is generated as follows. The raster image process generates the CMYK plane data and the white (underbase) plane data. The raster image processor or another processor compares every pixel as follows. For every white plane pixel, a comparison is made to determine if there is a CMYK pixel. If there is at least one corresponding CMYK pixel then such pixel is not a highlight white. However, when there is no corresponding CMYK pixel, then such pixel is determined to be a highlight white pixel.

Figure 5A:
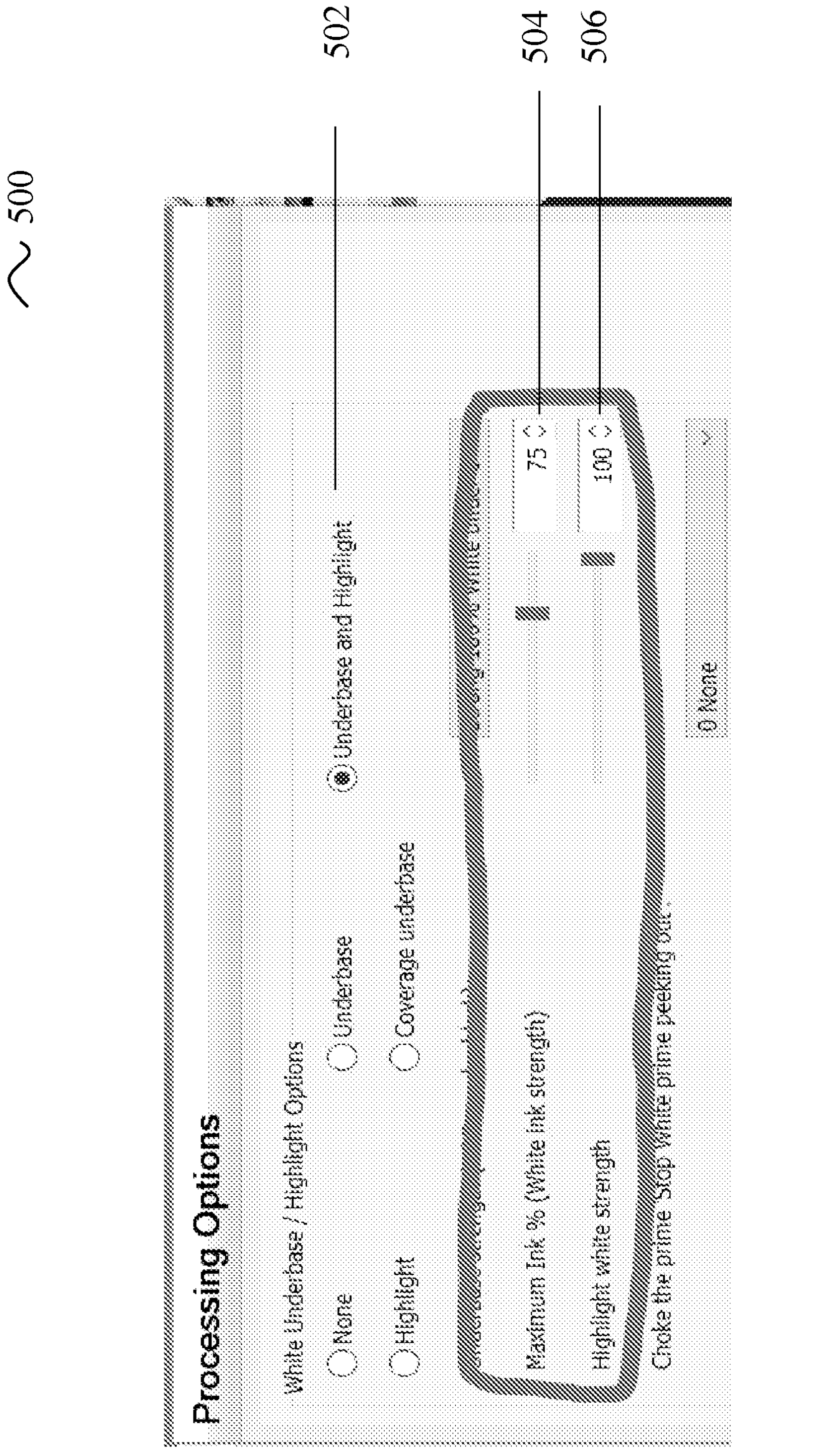
FIG. 5A is an example graphical user interface for inputting a maximum white ink strength value and a highlight white strength value, in accordance with an embodiment.
Figure 5B:
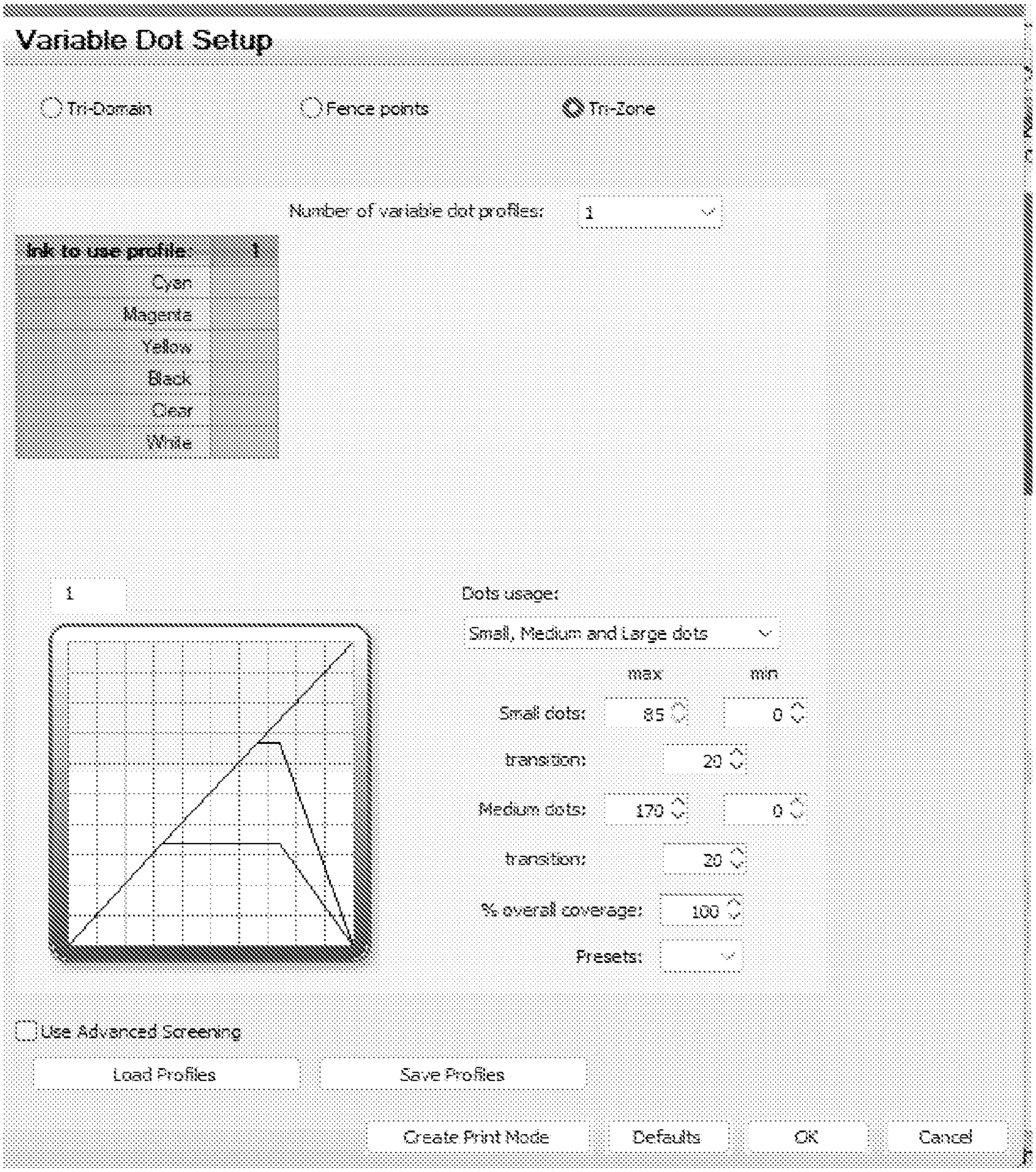
FIG. 5B is an example graphical user interface for inputting a dot usage values, in accordance with an embodiment.

At step 620, a processor (e.g., processor 702 processing instructions 726 of FIG. 7) processes the RIPed data as follows. For each pixel in the white underbase data:

- determine whether a corresponding pixel exists in the highlight white data, and
- in response to determining that the corresponding pixel exists in the highlight white data, increase the value of the underbase pixel by a higher value (e.g., by evaluating and using each of the maximum ink percentage 504 and the highlight white strength 506 of FIG. 5A). E.g., if the underbase is maximized at 60% and the highlight white is at 80%, then the system and method are configured to go to that underbase plane and effect a change to the value of the pixel from 60 to 80. The values 60 and 80 are by way of example and are not meant to be limiting.

At step 630, the printer prints onto the substrate the white underbase data that includes at least one white underbase pixel at the higher value. For example, effectively product 400 such as that in FIG. 4 is printed in one pass. That is, the white underbase is printed in the one pass, where the values of the underbase are greater at the areas where only white (or close to white) are intended to be printed.

At step 640, the printer prints onto the substrate the color data. For example, the printed product 200 shown in FIG. 2 illustrates the result after step 640 is finished.

An Example Machine Overview

Figure 7:
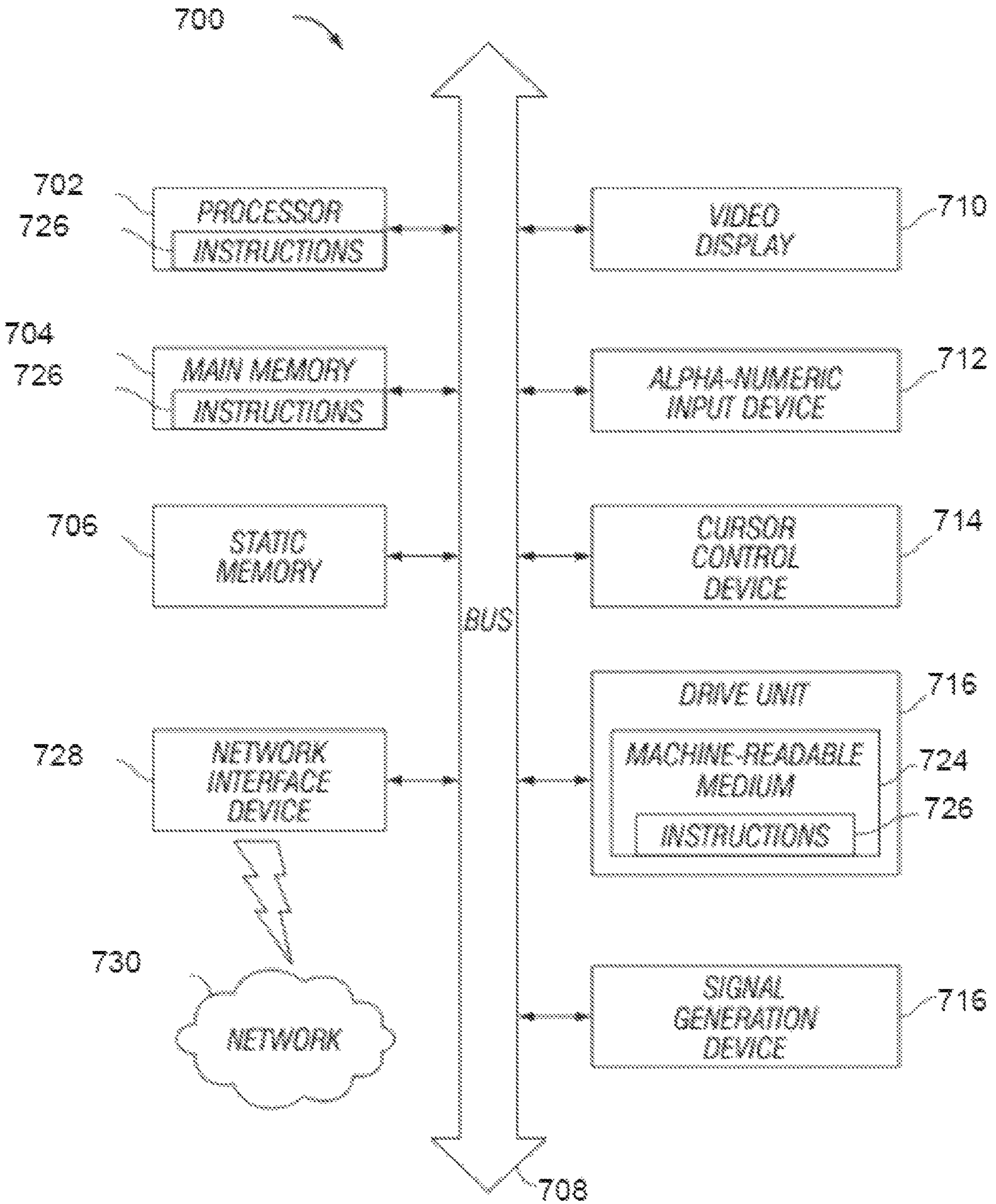
FIG. 7 is a block schematic diagram of a system in the exemplary form of a computer system, according to an embodiment.

FIG. 7 is a block schematic diagram of a machine in the exemplary form of a computer system 700 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a display unit 710, for example, a liquid crystal display (LCD) or a cathode ray tube (CRT). The computer system 700 also includes an alphanumeric input device 712, for example, a keyboard; a cursor control device 714, for example, a mouse; a disk drive unit 716, a signal generation device 718, for example, a speaker, and a network interface device 728.

The disk drive unit 716 includes a machine-readable medium 724 on which is stored a set of executable instructions, i.e. software, 726 embodying any one, or all, of the methodologies described herein below. The software 726 is also shown to reside, completely or at least partially, within the main memory 704 and/or within the processor 702. The software 726 may further be transmitted or received over a network 730 by means of a network interface device 728.

In contrast to the system 700 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

It should be appreciated that printing white ink is used as an underbase for many markets including but not limited to direct to garment, screen printing, direct to film, UV solutions, solvent sign graphics, and latex (e.g., latex gloves and latex clothing). Solvent is frequently used for backlighting and consistent with embodiments herein, adding white to this kind of process helps with the opacity of print on a clear/semi-transparent media to increase the vibrancy of the colors. Solvent can be used for outdoor signage, Window graphics, vehicle graphics, billboards, banners and much more.

This innovation can improve the brightness of white only areas in all of these and other markets. Any process where white ink is printed can benefit from the innovation where a highlight white process is included as part of the underbase, reducing print time that would otherwise be required to improve white only areas and allowing to improve the brightness of white only areas in single pass printing processes. Put another way, the innovation allows for when no color is being deposited onto an area, then the maximum white ink limit can be much higher than the prescribed underbase.

Although the invention is described herein in terms of several embodiments, one skilled in the art will readily appreciate that other applications may be substituted for those set forth herein without departing from the spirit and scope of the present invention. Accordingly, the invention should only be limited by the Claims included below.

The invention claimed is:

1. A method for printing a white underbase and a highlight white onto a substrate in one pass, the method comprising:

processing, by a raster image processor, image data and generating from said image data any corresponding white underbase data, color data, and highlight white data;

for each pixel in the white underbase data:

determining whether a corresponding pixel exists in the highlight white data; and in response to determining that the corresponding pixel exists in the highlight white data, increasing an ink percentage value of the underbase pixel to by a higher ink percentage value;

printing onto the substrate the white underbase data that includes at least one white underbase pixel at the higher ink percentage value; and printing onto the substrate the color data.

2. The method of claim 1, wherein generating the highlight white data further comprises:

for each pixel in the white underbase data:

determining whether a corresponding color pixel exists; and in response to determining that the corresponding color pixel does not exist, generating a corresponding highlight white pixel.

3. The method of claim 1, wherein the substrate is any of or any combination of:

a garment; film; and UV printable substrate.

4. The method of claim 1, wherein the color data is derived from any combination of process color spaces.

5. The method of claim 1, wherein the higher value is predetermined or is customizable.

6. The method of claim 1, wherein for each pixel in the white underbase data:

the method further comprises determining whether a corresponding pixel exists in the color data wherein the corresponding pixel in the color data is within a predetermined percentage of a specific color, thereby being considered to be perceived by a human eye as a highlight white.

7. The method of claim 1, wherein the printing is performed using any of the inkjet, laser, thermal, or screen printing technologies.

8. The method of claim 1, wherein when the printing is performed by a thermal printer, the method further comprises:

adding a second white thread and using the second white thread to increase the ink percentage value of the underbase pixel.

9. The method of claim 1, wherein when the printing is performed by a laser printer, the method further comprises:

adding a second white toner and using the second white toner to increase the ink percentage value of the underbase pixel.

10. The method of claim 1, wherein the printing is performed by an inkjet printer for a direct to garment (DTG) process or for a direct to film (DTF) process.

11. The method of claim 1, further comprising receiving user input indicating a first white ink limit for the white underbase data and a second white ink limit for the white highlight data, wherein the white underbase ink limit corresponds to the amount of ink to use in printing the white underbase and the white ink limit corresponds to the amount of ink to use in printing the highlight white data.

12. The method of claim 1, wherein the underbase ink limit is an amount of white ink limit used when color is printed on the same pixel.

13. The method of claim 1, wherein the highlight white limit is a white ink limit used when only white or a predetermined amount of a color is printed on a pixel.

14. A system for printing a white underbase and a highlight white onto a substrate in one pass, the system comprising:

one or more processors:

memory coupled to the one or more processors, wherein the memory includes instructions executable by the one or more processors to:

process, by a raster image processor, image data and generate from said image data any corresponding white underbase data, color data, and highlight white data;

for each pixel in the white underbase data:

determine whether a corresponding pixel exists in the highlight white data; and in response to determining that the corresponding pixel exists in the highlight white data, increase an ink percentage value of the underbase pixel to higher ink percentage value;

print onto the substrate the white underbase data that includes at least one white underbase pixel at the higher ink percentage value; and print onto the substrate the color data.

15. The system of claim 14, wherein generating the highlight white data further comprises instructions to:

for each pixel in the white underbase data:

determine whether a corresponding color pixel exists; and in response to determining that the corresponding color pixel does not exist, generate a corresponding highlight white pixel.

16. The system of claim 14, wherein for each pixel in the white underbase data:

the method further comprises instructions to determine whether a corresponding pixel exists in the color data wherein the corresponding pixel in the color data is within a predetermined percentage of a specific color, thereby being considered to be perceived by a human eye as a highlight white.

17. The system of claim 14, wherein the printing is performed by an inkjet printer for a direct to garment (DTG) process or for a direct to film (DTF) process.

18. The system of claim 14, further comprising instructions to receive user input indicating a first white ink limit for the white underbase data and a second white ink limit for the white highlight data, wherein the white underbase ink limit corresponds to the amount of ink to use in printing the white underbase and the white ink limit corresponds to the amount of ink to use in printing the highlight white data.

19. The system of claim 14, wherein the underbase ink limit is an amount of white ink limit used when color is printed on the same pixel.

20. The system of claim 14, wherein the highlight white limit is a white ink limit used when only white or a predetermined amount of a color is printed on a pixel.

* * * * *